US011973293B2

(12) United States Patent
Thomsen

(10) Patent No.: US 11,973,293 B2
(45) Date of Patent: Apr. 30, 2024

(54) USER CONTROL UNIT AND CABLE CONNECTOR

(71) Applicant: LINAK A/S, Nordborg (DK)

(72) Inventor: Henrik Agerley Thomsen, Broager (DK)

(73) Assignee: Linak A/S, Nordborg (DK)

( * ) Notice: Subject to any disclaimer, the term of this patent is extended or adjusted under 35 U.S.C. 154(b) by 549 days.

(21) Appl. No.: 17/279,821

(22) PCT Filed: Oct. 7, 2019

(86) PCT No.: PCT/DK2019/000318
§ 371 (c)(1),
(2) Date: Mar. 25, 2021

(87) PCT Pub. No.: WO2020/069702
PCT Pub. Date: Apr. 9, 2020

(65) Prior Publication Data

US 2021/0399465 A1 Dec. 23, 2021

(30) Foreign Application Priority Data

Oct. 5, 2018 (DK) .......................... PA 2018 00697

(51) Int. Cl.
*H01R 13/625* (2006.01)
*A61G 7/018* (2006.01)

(52) U.S. Cl.
CPC .......... *H01R 13/625* (2013.01); *A61G 7/018* (2013.01); *A61G 2203/12* (2013.01); *H01R 2201/12* (2013.01)

(58) Field of Classification Search
CPC .............. H01R 13/625; H01R 2201/12; H01H 2223/04; H01H 2231/032; H01H 9/0228
See application file for complete search history.

(56) References Cited

U.S. PATENT DOCUMENTS 5,662,488 A * 9/1997 Alden .................. H01R 13/625 439/314
6,162,082 A * 12/2000 Karsten ................ H01R 13/523 439/321

(Continued)

FOREIGN PATENT DOCUMENTS

WO 2006056200 A2 6/2006
WO 2007054093 A1 5/2007

(Continued)

*Primary Examiner* — Vanessa Girardi
(74) *Attorney, Agent, or Firm* — Dykema Gossett PLLC

(57) ABSTRACT

A linear actuator system with a controller, said controller comprising a controller and programmable means for controlling the operation of an electrical motor. The electrical linear actuator system comprises a user control unit (1), an electrical cord with a plug for connecting the user control unit (1) and the controller, where the controller and/or the user control unit comprises a socket (1*a*) for receiving the plug (2). The plug (2) comprises a locking ring (5), which is rotatable relative to the plug (2), and the socket (1 a) comprises an opening (16) for receiving the plug (2) including the locking ring (5) in the opening (16) of the socket (1 a). The socket (1 *a*) further comprises an aperture (4) through which a part of the locking ring (5) is accessible when the plug (2) including the locking ring (5) is inserted into the opening (16) of the socket (1*a*). The locking ring (5) and the opening (16) of the socket are adapted such that the locking ring (5), when inserted in the opening (16), can be rotated between an unlocked position and a locked position: where, in the unlocked position, a protrusion (8*a*, 8*b*) is received in and aligned with an axial part (12*a*, 12*b*) of a recess (12), such that the plug (2) may freely be inserted into or removed from the socket (1*a*), and where, in the locked position, the protrusion (8*a*, 8*b*) engages the radial part (12*c*,12*d*) of the recess (12), such that the plug (2) is prevented from being unplugged.

9 Claims, 7 Drawing Sheets

(56) References Cited

U.S. PATENT DOCUMENTS

Figure 1:
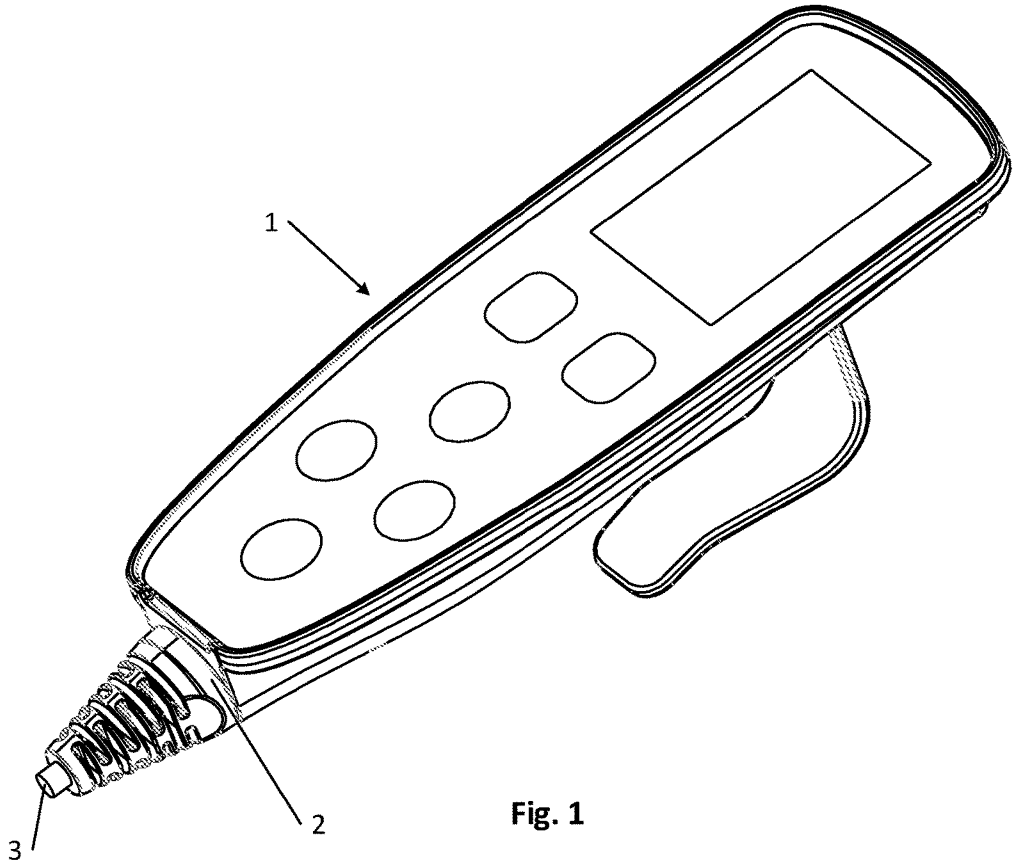

| | | | | |
|---|---|---|---|---|
| 7,980,877 | B2 * | 7/2011 | Knudsen | H02K 5/225<br>439/314 |
| 8,305,037 | B2 * | 11/2012 | Poh | H01M 50/216<br>429/97 |
| 8,425,244 | B2 * | 4/2013 | Bayliss | H01R 13/625<br>439/320 |
| 8,696,374 | B2 * | 4/2014 | Oe | B60L 53/18<br>439/321 |
| 2010/0213042 | A1 | 8/2010 | Smidt et al. | |
| 2010/0311260 | A1 | 12/2010 | Knudsen et al. | |
| 2013/0137287 | A1 | 5/2013 | Grimm | |

FOREIGN PATENT DOCUMENTS

| | | | |
|---|---|---|---|
| WO | 2009062514 | A1 | 5/2009 |
| WO | 2012139578 | A2 | 10/2012 |

* cited by examiner

USER CONTROL UNIT AND CABLE CONNECTOR

CROSS-REFERENCE TO RELATED APPLICATIONS

This application is a national stage filing based upon international application no. PCT/DK2019/000318, filed 7 Oct. 2019 (the ’318 application), and published in English on 9 Apr. 2020 under international publication no. WO 2020/069702 A1, which claims priority to Denmark (DK) patent application no. PA 2018 00697, filed 5 Oct. 2018 (the ’697 application). The ’318 application and the ’697 application are both hereby incorporated by reference as though fully set forth herein.

The present invention relates to a detachable electrical cord for an electrical linear actuator system to be used in or in connection with adjustable articles of furniture, including hospital beds, patient supports or the like.

In the present application, the following definitions are used:

Cord: a detachable electrical cord, i.e. a cable for transferring electrical power and/or signals having a plug connected to at least one end of the cable, where the plug can be plugged into or removed from an electrical equipment, such as e.g. a remote control, a control panel, a controller, a junction box or an electrical linear actuator.

Plug: an electrical plug comprising a main body, the main body of the plug encasing an end of a cable and comprising an electrical connector attached to the cable. The main body and the electrical connector having a shape and dimensions which fit into a corresponding socket.

User control unit: a unit comprising a user interface allowing the user to give input commands and possibly further comprising means for displaying the status of the connected equipment during operation.

Remote control: a handheld user control unit, which via a cord is connected to the actuator system. One end of the cord can be connected to the remote control while the other end of the cord can be connected to e.g. a controller, a junction box or an electrical linear actuator.

Control Panel: a user control unit attached to a part of the adjustable piece of furniture and via a cord is connected to the actuator system. One end of the cord can be connected to the control panel. The other end of the cord can be connected to a controller, a junction box or directly to an electrical linear actuator.

Controller: containing the electrical circuit and optionally programmable means for controlling an electrical linear actuator system. The controller comprises inputs/outputs for a user control unit, for controlling the motor(s) and/or supplying the motor(s) of an electrical linear actuator system with power. Further, the controller may comprise inputs/outputs for monitoring devices, for instance monitoring of the status/activity of the individual parts of the actuator system including the status of e.g. sensors for safety and emergency switches. The controller can be arranged in a separate unit having its own housing or can be integrated in other units in the electrical linear actuator system. The electrical connection to and from the controller can be fixed cables and/or detachable cords.

Junction box: a box having a separate housing comprising means for connecting cables and/or sockets for plugging in cords and further comprises means for interconnecting wires of an electrical linear actuator system.

Electrical linear actuator system: system as defined in the preamble of claim 1, comprising one or more electrical linear actuators, one or more user control units e.g. a control panel or a remote control, and optionally also one or more monitoring devices for monitoring positions and activities of the individual parts of the electrical linear actuator system and/or the article of furniture or the equipment, which should be adjusted.

In electrical linear actuator systems for hospital beds, patient supports or the like, a wired connection between a user control unit attached to the bed, patient support or the like and a controller in its own housing or integrated with the electrical linear actuator or a junction box for an electrical linear actuator system is preferred. For maintenance reasons, such as repair or replacement, it is often preferred that such a wired connection is a cord consisting of a cable and having at least one plug.

An example of an electrical linear actuator system for a hospital bed including a controller and a handheld control unit with a wired connection between a controller and a control panel is shown in WO2012139578 to LINAK A/S. The publication WO2012139578 is hereby incorporated by reference as though fully set forth herein.

As medical or care equipment need to maintain a high hygienic standard, they need to be frequently cleaned, often with steam and/or hot water. Therefore, the plugs and/or the corresponding sockets should contain sealing means for preventing moisture ingress into the control unit, controller housing and junction boxes attached to the article of furniture. Additionally, all parts and all sealings will have to be made of materials able to withstand cleaning agents.

It is desired for the plugs of the cords to be fixed in their corresponding sockets in a manner preventing unintended unplugging, e.g. during operation or during cleaning of the article of furniture. In WO2006056200 to LINAK A/S relating to a controller housing for electrical linear actuators, the cable connection for the controller is provided with locking elements for the plug in order to prevent unintended unplugging of the plug from the controller. The publication WO2006056200 is hereby incorporated by reference as though fully set forth herein.

Further, it is desired to have the plugs fixed in a manner preventing unauthorized persons from unplugging the cord. On the other hand, it is required that the cord can be detached/replaced in a simple manner by authorized persons in case the cord or the remote control becomes defective or needs to be replaced with another cord, for instance having a different length or a remote control of a different type.

An object of the invention is to provide a plug/socket connection for an electrical linear actuator system, which can only be detached by means of a tool.

Another object of the invention is to provide a plug/socket connection, which can only be unlocked before unplugging by means of a tool, but without having to disassemble the plug or the socket or other parts used for retaining the plug.

Another object of the invention is to provide a socket for the plug as an integrated part of the housing (e.g. remote control, control panel, controller housing and/or junction box).

Another object of the invention is to provide a plug/socket connection which is water and dust proof.

These objects are, according to the invention, achieved by providing a plug/socket connection including locking means as described below with reference to the embodiments of the invention.

In an embodiment, an electrical linear actuator system comprises at least one electrical linear actuator, an electrical motor for driving the linear actuator, a controller for controlling the operation of the electrical motor, at least one user control unit, at least one electrical cord comprising at least one plug for connecting the user control unit and the controller, where the controller or the user control unit comprises a socket for receiving the plug, and where the linear actuator system comprises a locking ring rotatably arranged relative to the plug, and where the socket comprises an opening for receiving the plug including the locking ring, and where the socket comprises an aperture through which a part of the locking ring is accessible when the plug including the locking ring is engaged with the socket, where the locking ring comprises at least one protrusion and the opening of the socket comprises at least one recess, where the at least one recess comprises an axial part and a radial part, and where the locking ring and the opening of the socket are adapted such that the locking ring when inserted in the opening can be rotated between a first position, i.e. an unlocked position, and a second position, i.e. a locked position where, in the first position, the unlocked position, the at least one protrusion is received in and aligned with the axial part of the recess, such that the plug may freely be inserted into or removed from the socket, and where, in the second position, the locked position, the at least one protrusion engages the radial part of the recess, such that the plug is prevented from being unplugged.

Accordingly, the first position is the unlocked position and the second position is the locked position of the locking ring.

The plug/socket ensures a safe and reliable connection and prevents unintended unplugging of the plug, while intended unplugging of the plug is made easy.

In an embodiment, the aperture extends in the radial direction with a length corresponding to the distance between the first position and the second position of the locking ring.

In an embodiment, the locking ring comprises a groove accessible through the aperture. The groove constitutes a contact point for engagement with the locking ring. This can in a practical way be done with a tool that can e.g. be a screwdriver fitting into the groove.

In an embodiment, the plug comprises a recess and the locking ring comprises an opening between a first end and a second end which is smaller than the diameter of the recess and where the locking ring is made of a resilient material, whereby the width of the opening between the first end and the second end can be widened to at least equal the diameter of the recess. Thus, it is possible to mount the locking ring in an easy operation and ensure a cost-efficient manufacturing of the plug.

In an embodiment, the locking ring is provided with an inwardly extending protrusion, and the recess of the plug is provided with a first groove and a second groove, where the first groove is adapted to receive the protrusion when the locking ring is in the second position, i.e. the locked position, and where the second groove is adapted to receive the protrusion when the locking ring is in the first position, i.e. the unlocked position, thus facilitating that the locking ring remains in its current position, until it is actively rotated into a different position.

In an embodiment, the locking ring is equipped with one or more additional protrusions and the recess is equipped with corresponding additional recesses.

In an embodiment, the aperture, through which part of the locking ring is accessible, is extending in the axial direction with a width of less than 5 millimetres, preferably less than 3 millimetres. The narrow dimensions of the aperture prevent a user from accessing and rotating the locking ring merely by using a finger, but still allow access for a tool.

In an embodiment, the controller is arranged in a separate housing or is integrated in the housing of the electrical linear actuator itself.

In an embodiment, the plug comprises a sealing ring mounted onto a sealing recess, where the sealing ring recess is positioned between the recess for the locking ring and the electrical connector.

In an embodiment, the plug comprises an electrical connector, a circular sealing ring recess and a sealing ring, where the circular sealing ring recess is placed between the recess and the electrical connector. The sealing ring is made of a resilient material and has an outer diameter, which is slightly larger than the inner diameter of the opening, thus providing a sealing connection.

In an embodiment, the sealing ring has two spaced apart outer lips. Upon insertion or removal of the plug, the lips bend, thereby minimizing the resistance against axial movement, while still providing a reliable sealing.

In an embodiment, the inner side of the sealing ring is provided with at least two inner protrusions, providing an efficient sealing against moisture ingress.

In an embodiment, the inner side of the sealing ring is provided with at least two spaced apart protrusions having a half circular cross section protruding from its inner periphery.

In an embodiment, one end of a cord is equipped with a plug, which can be locked to a corresponding socket in the adjustable article of furniture.

Figure 2:
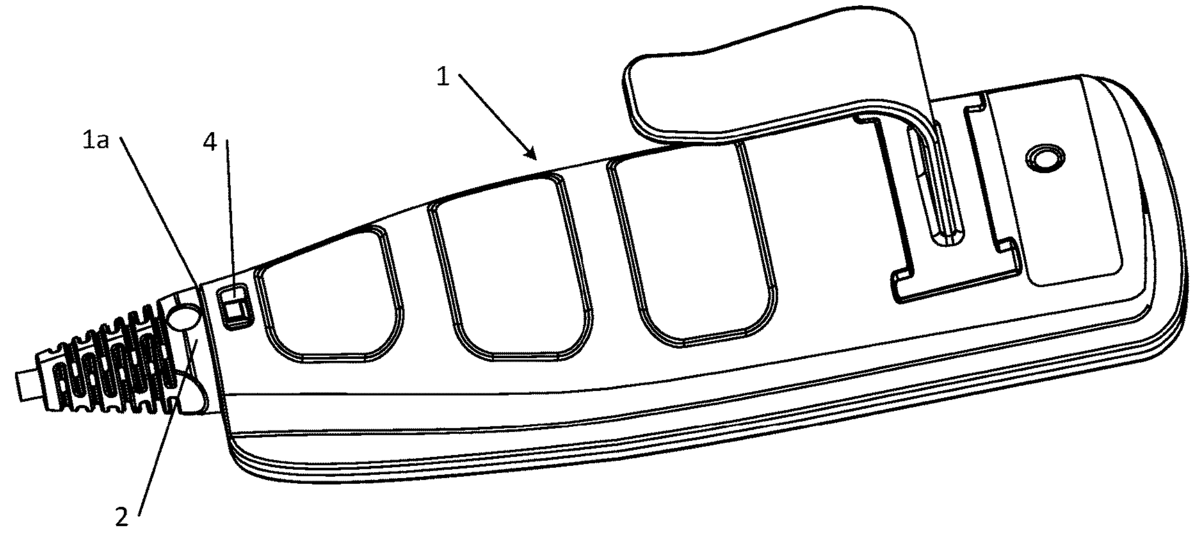
Figure 3:
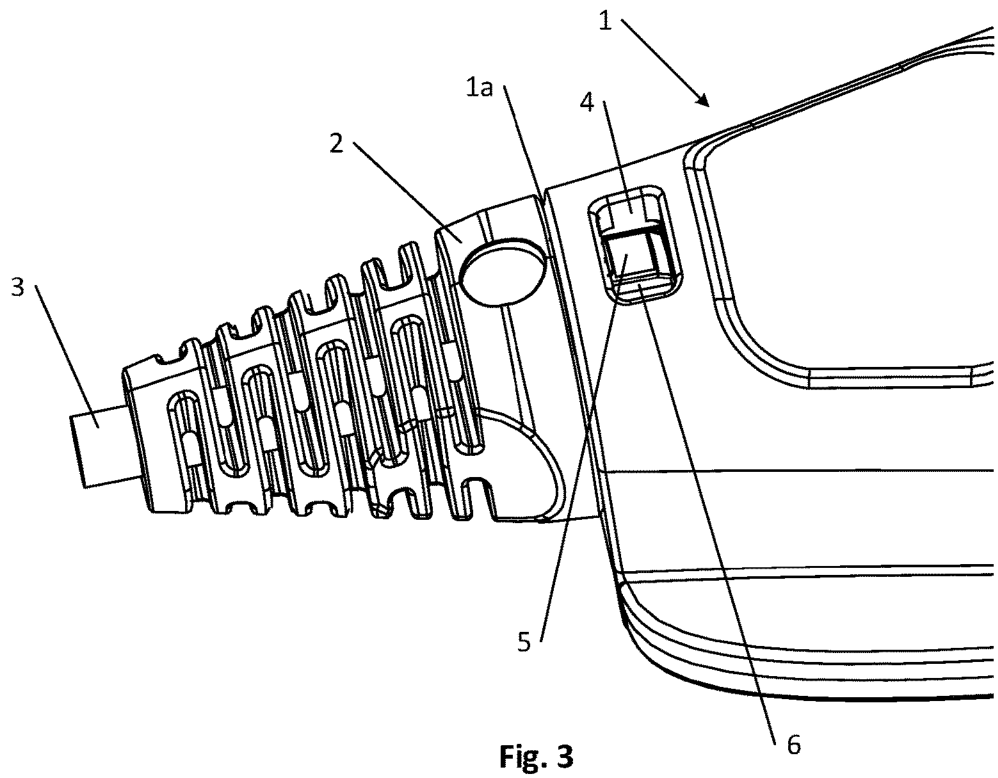
Figure 4:
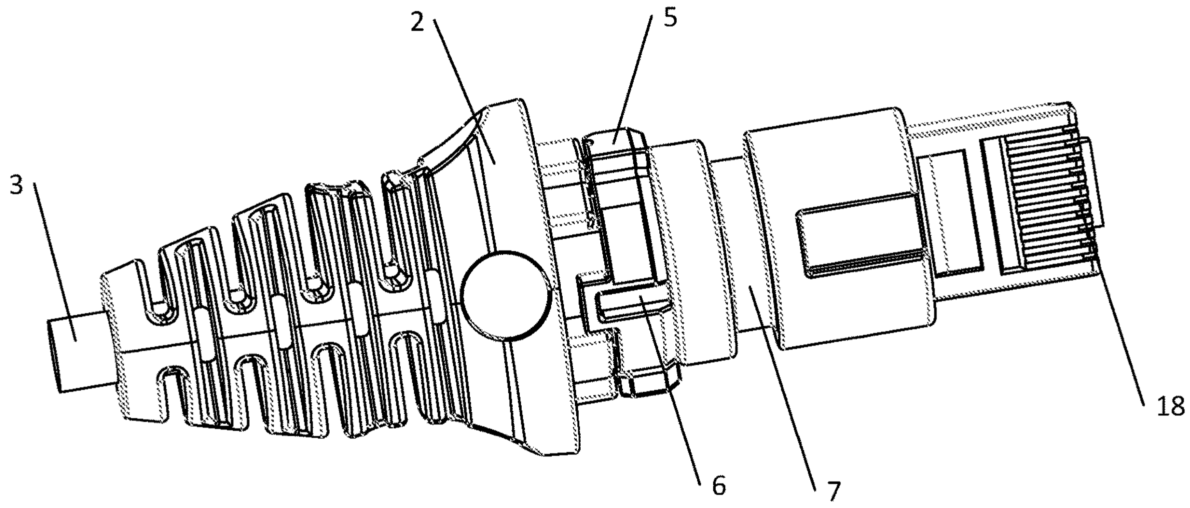
Figure 5A:
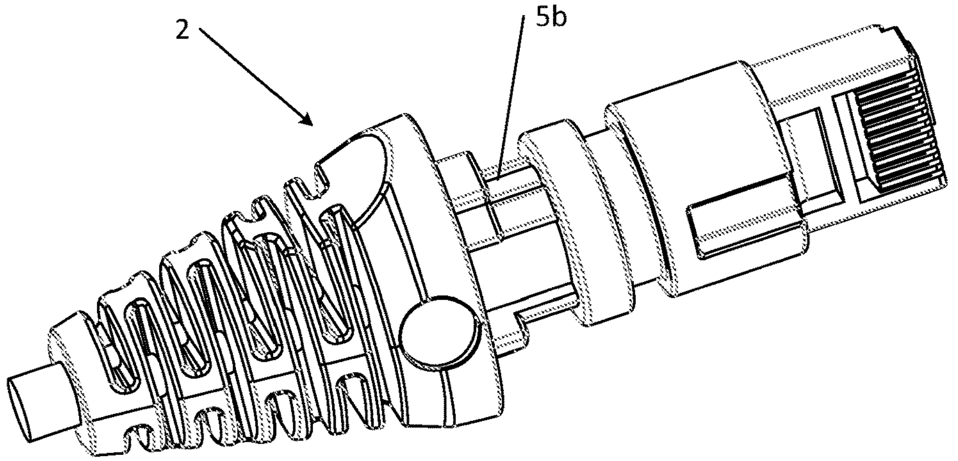
Figure 5B:
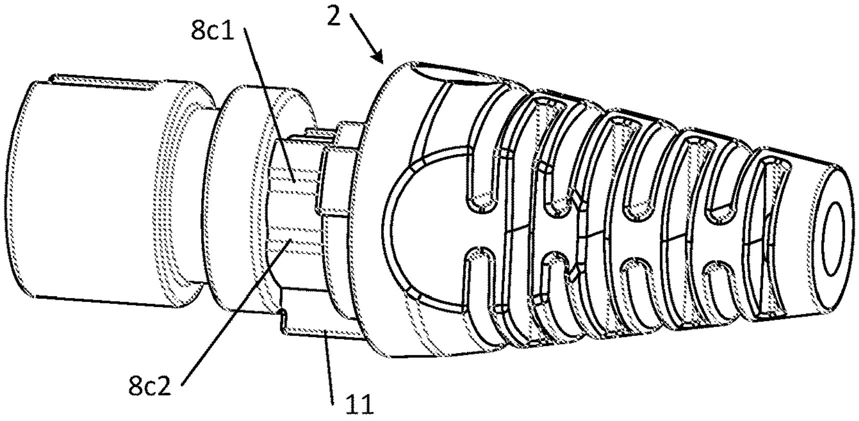
Figure 5C:
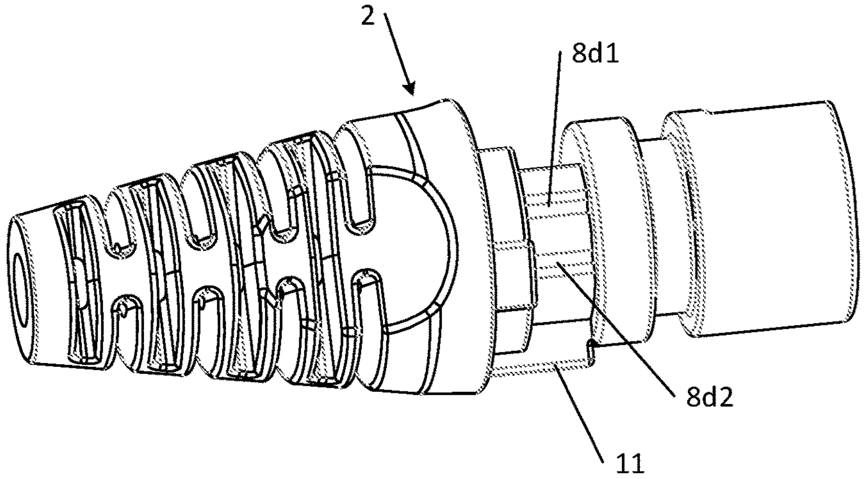
Figure 6:
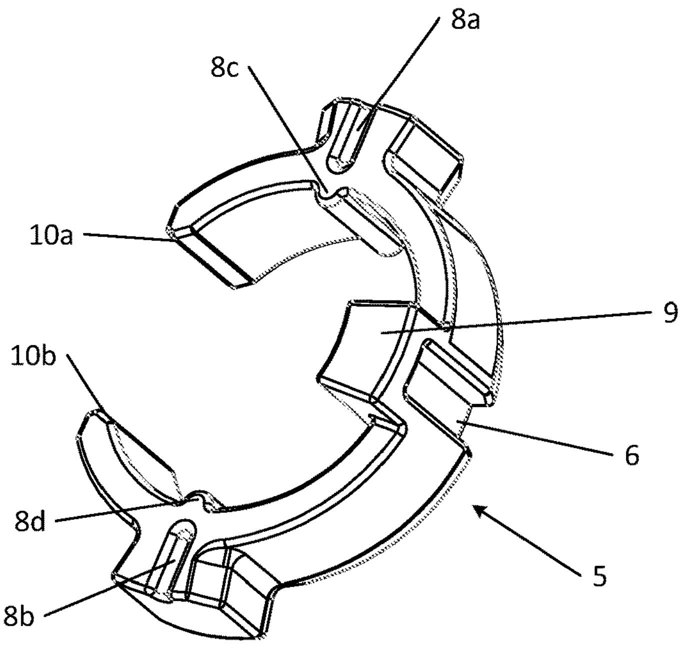
Figure 7:
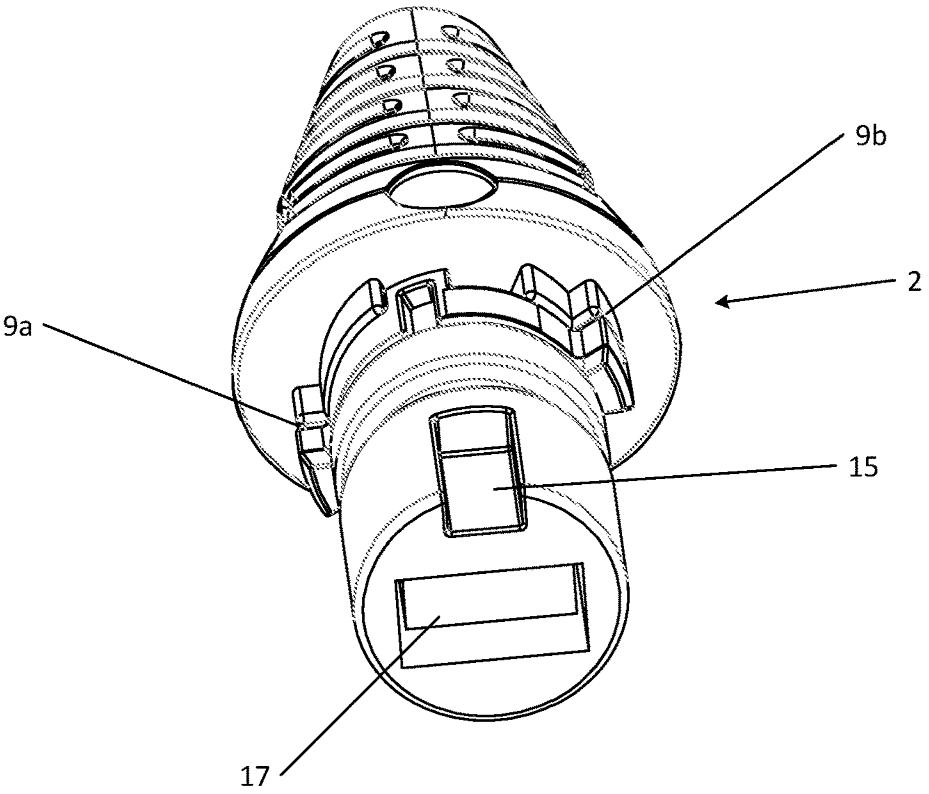
Figure 8A:
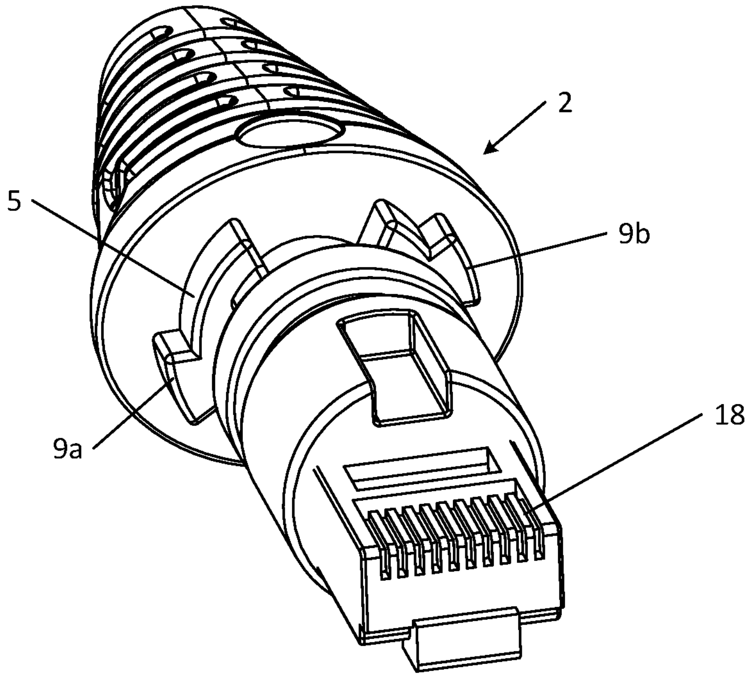
Figure 8B:
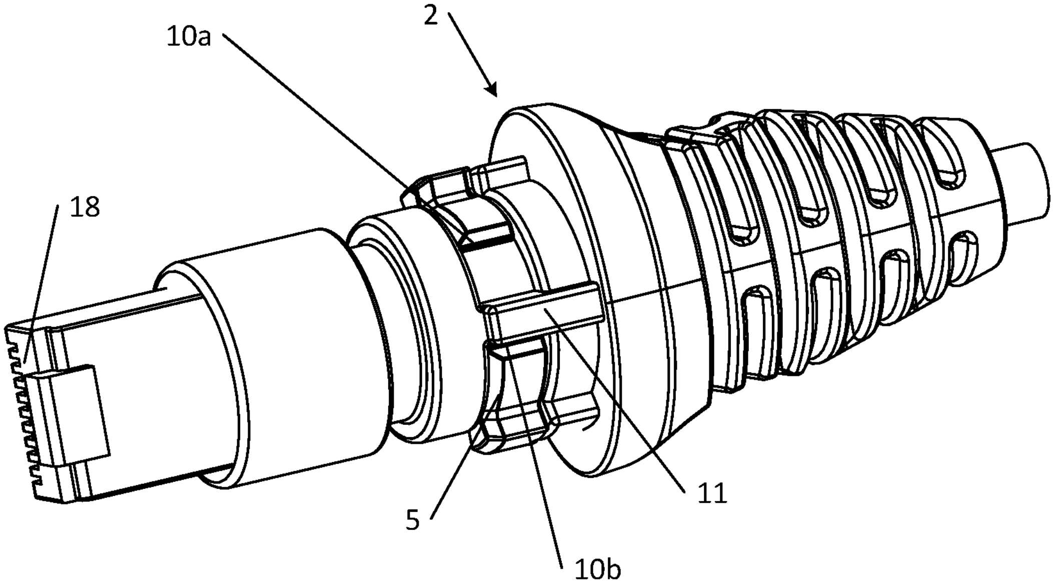
Figure 9A:
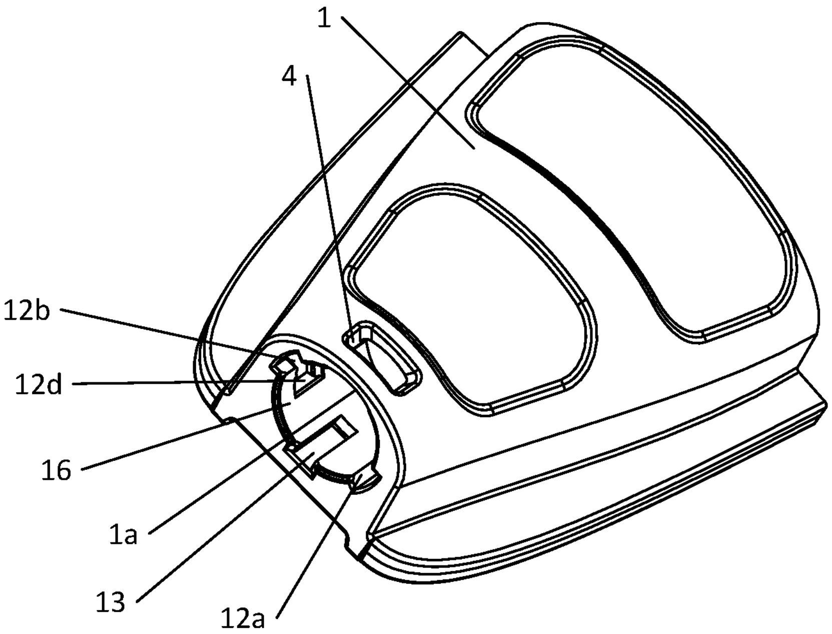
Figure 9B:
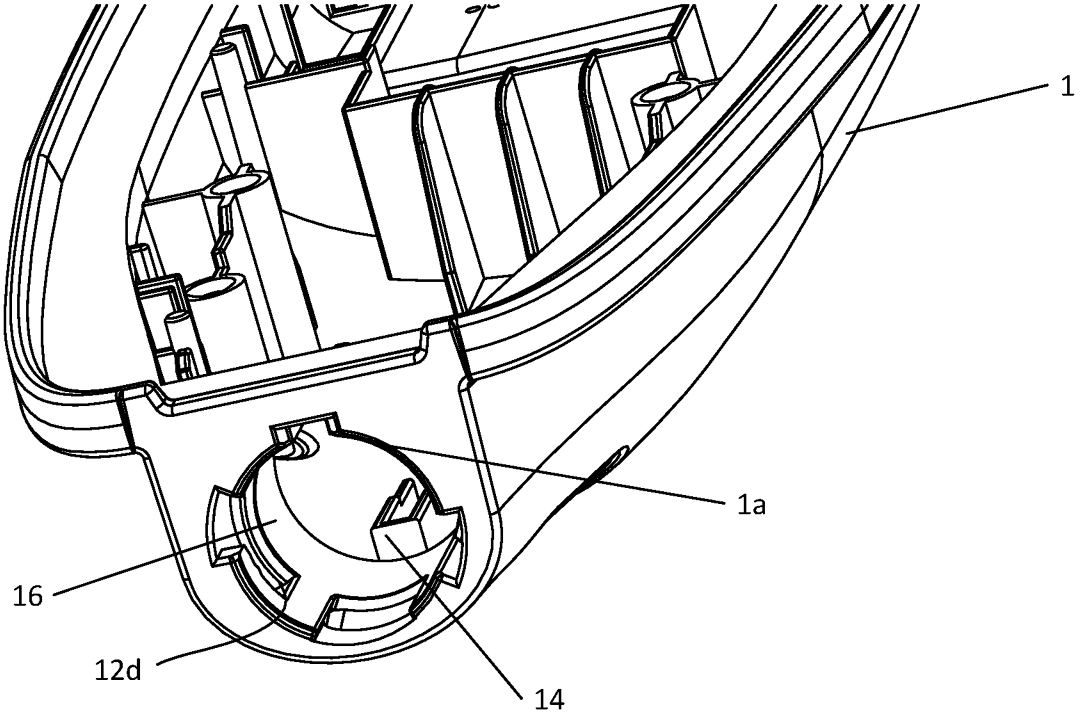
Figure 10A:
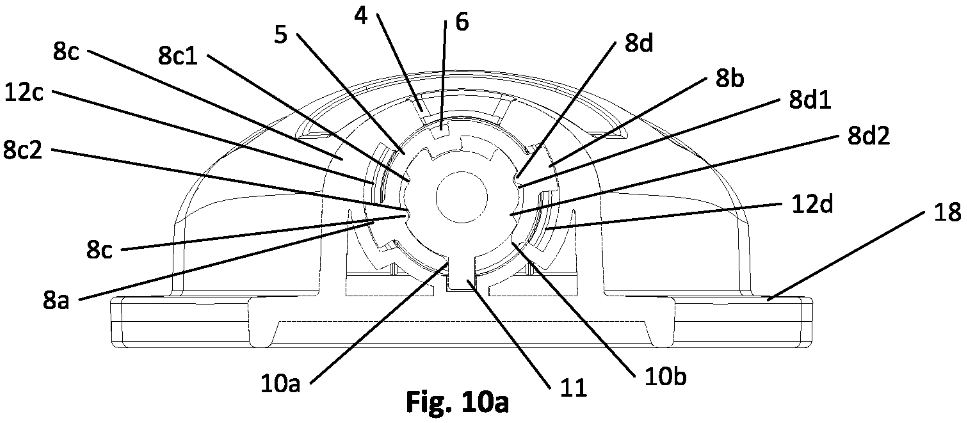
Figure 10B:
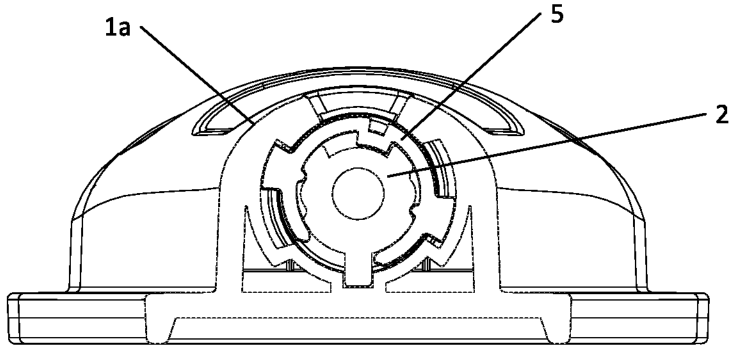
Figure 11:
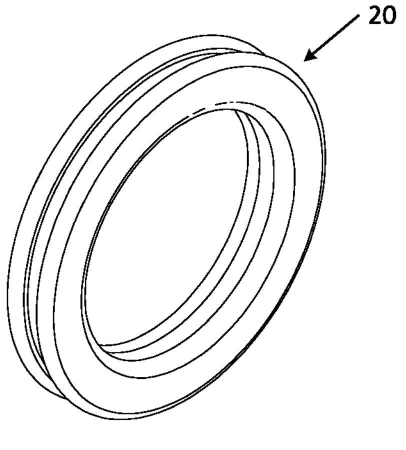
Figure 12:
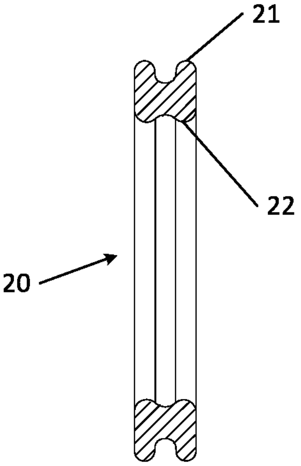

The plug/socket connection, according to the invention, will be described more fully below with reference to the accompanying drawing, in which:

FIG. 1 shows a front perspective view of a remote control with a detachable cord, FIG. 2 shows the rear perspective view of a remote control with a detachable cord, FIG. 3 shows an enlarged view of a plug inserted into a remote control, FIG. 4 shows a plug with a locking ring mounted, FIG. 5*a* shows the plug of FIG. 4 but without the locking ring, FIG. 5*b* shows a side view of the plug of FIG. 5*a*, but without the connector, FIG. 5*c* shows a different side view of the plug of FIG. 5*a*, also without the connector, FIG. 6 shows the locking ring, FIG. 7 shows the plug without the locking ring, FIG. 8*a* shows a side view of the plug with the locking ring mounted, FIG. 8*b* shows a different side view of the plug of FIG. 8*a* with the locking ring mounted, FIG. 9*a* shows a rear view of the housing with a socket, FIG. 9*b* shows a front view of the housing with a socket, FIG. 10*a* shows a cross section through the assembled plug with the locking ring in the first position, i.e. the unlocked position, FIG. 10*b* shows a cross section through the assembled plug with the locking ring in the second position, i.e. the locked position, FIG. 11 shows a sealing ring, and FIG. 12 shows a cross section through the sealing ring.

FIG. 1 is a front perspective view of a remote control 1 with a detachable cord. The cord consists of a plug 2 and a cable 3. The remote control 1 in this example is a handheld user control unit for an adjustable hospital bed.

FIG. 2 is a rear perspective view of the remote control 1 having a housing with a socket 1*a* for a plug 2, here shown integrated. When the plug is plugged in, the aperture 4 in the socket 1*a* provides access to a part of the plug 2.

FIG. 3 is an enlarged view of the plug 2 including a locking ring 5 inserted into the socket 1*a* in the housing of the remote control 1. Through the aperture 4 in the socket 1*a* in the housing of the remote control 1, the locking ring 5 and a groove 6 in the locking ring 5 can be accessed by means of a tool (not shown). The locking ring 5 is a separate part, which can be rotated between two end positions by inserting a tool into the groove 6 and pushing the locking ring 5 in one or the other rotational direction.

FIG. 4 shows the plug 2 and illustrates the sealing ring recess 7 for a sealing ring surrounding the plug 2 (see FIG. 12 and FIG. 13), an electrical connector 18, which internally in the plug is connected to the wires of the cable 3, and a locking ring 5 with a groove 6 that can be used for manipulating the locking ring. More specifically a tool as e.g. a flat head screwdriver that fits the groove 6 can be used to rotate and shift the state of locked or unlocked of the locking ring 5 in its position in the socket 1*a*.

FIG. 5*a* illustrates the plug 2 without the locking ring 5 mounted. The plug 2 has a recess 5*b* adapted for receiving the locking ring 5.

FIG. 5*b* is a side view of the plug 2 illustrating the position grooves 8*c*1 and 8*c*2 in the circular recess 5*b*. In this embodiment, the plug 2 has a protrusion 11, which is received by the guiding recess 13 in the socket 1*a* (See FIG. 9*a*) thus keeping the main body of the plug 2 in a rotationally fixed position when plugged in.

FIG. 5*c* is a side view of the plug 2 illustrating the position grooves 8*d*1 and 8*d*2 in the recess 5*b* and the protrusion 11.

FIG. 6 illustrates the locking ring 5. The locking ring 5 is preferably made of a resilient plastic material. The plastic material preferably contains about 80% polypropylene and about 20% talc and is moulded in one piece. The locking ring 5 is shaped as an open ring with an inner diameter corresponding to the outer diameter of the recess 5*b* of the plug 2. The ring is open between the two ends 10*a* and 10*b* of the locking ring 5.

The locking ring 5 is provided with protrusions 8*a*,8*b* extending radially outwards from the outer surface of the locking ring 5. In a first position, i.e. the unlocked position of the locking ring 5, the protrusions 8*a*, 8*b* are received in or aligned with the axial part 12*a*, 12*b* of the recess 12 (see FIG. 9*a*), such that the plug 2 may freely be inserted into or removed from the socket 1*a*.

When the plug 2 including the locking ring 5 is fully inserted in the opening 16 of the socket 1*a*, the locking ring 5 can be rotated between the first position and a second position, i.e. between the unlocked and locked position. In the second position, the locked position, the protrusions 8*a*,8*b* engage the radial part 12*c*,12*d* of the recess 12, such that the plug 2 cannot be removed from the socket 1*a*.

The locking ring 5 is made of a resilient material, which serve at least two purposes. One is to enable the protrusions 8*c*, 8*d* to engage the grooves 8*c*1, 8*c*2, 8*d*1, 8*d*2 of the plug 2. More precisely, the protrusions 8*c* and 8*d* of the locking ring 5 extend inwardly from the inner side of the locking ring 5. Since the locking ring 5 is made of a resilient material, the protrusion 8*c* engages the grooves 8*c*1 and 8*c*2 of the plug 2, respectively (See FIG. 5*b*), when the locking ring 5 is in the first or the second position, respectively. Likewise, the protrusion 8*d* engages the grooves 8*d*2 and 8*d*1, respectively, when the locking ring 5 is in the first or the second position, respectively (See FIG. 5*c*). Further, the resilient material enables elastic deformation of the locking ring, whereby the distance between the two ends 10*a* and 10*b* can be increased to at least equal to the inner diameter of the recess 5*b* of the plug 2, making it possible to mount the locking ring 5 on the plug 2 or remove it in a simple manner.

FIG. 7 is a front view of the main body of the plug 2 without the locking ring 5 mounted, displaying a guiding recess 15 and an opening 17 for the electrical connector 18 (shown on FIG. 8). The guiding recess 15 is adapted for receiving the protrusion 14 (see FIG. 9*b*) of the corresponding socket 1*a*. The main body of the plug 2 is preferably a moulded plastic part. In an embodiment, the plastic material comprises 80% polypropylene and about 20% talc.

FIG. 8*a* shows the plug 2 with the locking ring 5 mounted.

FIG. 8*b* shows the plug 2 with the locking ring 5 and the opening between the two ends 10*a* and 10*b* of the locking ring.

FIG. 9*a* illustrates the rear side of the housing of the remote control 1 with the socket 1*a* having a circular opening 16 for receiving the plug 2. The opening 16 has a guiding recess 13 for receiving the protrusion 11 of the plug 2 (See FIG. 5*b*). The socket 1*a* has an aperture 4 for providing access to a part of the locking ring 5, when this is plugged into the socket 1*a*.

The opening 16 for the plug 2 comprises two axial recesses 12*a* and 12*b*. Upon insertion of the plug 2, the protrusions 8*a* and 8*b* of the locking ring 5 are aligned with the protrusions 9*a* and 9*b* of the plug 2, both set of protrusions fit into the axial recesses 12*a* and 12*b*, respectively. After the insertion, the locking ring 5 is rotated from the first position, i.e. the unlocked position, into the second position, i.e. the locked position, by inserting a small flat tool (e.g. a screwdriver) through the aperture 4 and into engagement with the groove 6 and rotating the locking ring 5 by means of the tool. Hereby, the protrusions 8*a* and 8*b* are rotated into the radial recesses 12*c* and 12*d*, respectively. In this position, the plug 2 cannot be moved in the axial direction and is thus locked. When the plug 2 is inserted in the socket 1*a*, the protrusions 9*a* and 9*b* will remain in the axial recesses 12*a* and 12*b* and prevent the main body of the plug 2 from rotating.

FIG. 9*b* illustrates the socket 1*a* of the housing of the remote control 1 with the opening 16 for receiving the plug 2. The rear end of the opening 16 is furnished with a protrusion 14, which is received by the guiding recess 15 of the plug 2 (see FIG. 7).

The plug 2 can only be released by rotating the locking ring 5 into the first position, i.e. the unlocked position, by means of a tool through the aperture 4. In this first position, the unlocked position, the protrusions 8*a* and 8*b* are again aligned with the axial recesses 12*a* and 12*b* allowing the plug 2 to be moved in the axial direction, and thereby allowing the plug 2 to be removed.

FIG. 10*a* is a cross section through the assembled plug 2 placed in the corresponding socket 1*a* with the locking ring 5 in the first position, i.e. the unlocked position.

FIG. 10*b* is a cross section through the assembled plug 2 in the corresponding socket 1*a* with the locking ring 5 in the second position, i.e. the locked position.

FIG. 11 shows a sealing ring 20 arranged in the recess 7 (see FIG. 4) between the locking ring 5 and the connector 18 in order to prevent water/moisture ingress through the opening 16 and/or the aperture 4 in order to prevent water/moisture from getting in contact with the electrical connector 18. The sealing ring 20 is made of a resilient rubber or plastic material.

FIG. 12 shows a cross section through the sealing ring 20, having two spaced apart lips 21 protruding from its outer periphery and two inner protrusions 22 having a half circular cross section protruding from its inner periphery.

What is claimed is:

1. A user control unit (1) and electrical cord (3) for a linear actuator system, wherein the linear actuator system comprises at least one electric linear actuator, an electric motor for driving the linear actuator, and a controller for controlling the operation of the electric motor, the user control unit (1) and electrical cord (3) comprising:

at least one plug (2) located on the electrical cord (3) for connecting to the user control unit (1);

a socket (1*a*) located on the user control unit (1) for receiving the plug (2), the socket (1*a*) comprising:

a locking ring (5) rotatably arranged relative to the plug (2);

an opening (16) for receiving the plug (2) including the locking ring (5); and an aperture (4) through which a part of the locking ring (5) is accessible when the plug (2) including the locking ring (5) is engaged with the socket (1*a*), wherein the locking ring (5) comprises at least one protrusion (8*a*, 8*b*) and the opening (16) of the socket (1*a*) comprises at least one recess, wherein the at least one recess comprises an axial part (12*a*,12*b*) and a radial part (12*c*,12*d*), and wherein the locking ring (5) and the opening (16) of the socket are adapted such that the locking ring (5) when inserted in the opening (16) can be rotated between a first position, an unlocked position, and a second position, a locked position:

wherein, in the first position, the unlocked position, the at least one protrusion (8*a*,8*b*) is received in and aligned with the axial part (12*a*,12*b*) of the recess, such that the plug (2) may freely be inserted into or removed from the socket (1*a*), and wherein, in the second position, the locked position, the at least one protrusion (8*a*,8*b*) engages the radial part (12*c*,12*d*) of the recess, such that the plug (2) is prevented from being unplugged.

2. The user control unit (1) and electrical cord (3) according to claim 1, wherein the aperture (4) extends in the radial direction with a length corresponding to the distance between the first position, the unlocked position, and the second position, the locked position, of the locking ring (5).

3. The user control unit (1) and electrical cord (3) according to claim 1 wherein the locking ring (5) comprises a groove (6) accessible through the aperture (4).

4. The user control unit (1) and electrical cord (3) according to claim 1, wherein the aperture (4) extending in the axial direction has a width of less than five millimeters and preferably less than three millimeters.

5. The user control unit (1) and electrical cord (3) according to claim 1 wherein the plug (2) comprises a recess (5*b*) and the locking ring (5) comprises an opening between a first end (10*a*) and a second end (10*b*) which is smaller than the diameter of the recess (5*b*), and where the locking ring (5) is made of a resilient material, whereby the width of the opening between the first end (10*a*) and the second end (10*b*) can be widened to at least equal the diameter of the recess (5*b*).

6. The user control unit (1) and electrical cord (3) according to claim 5 wherein the locking ring (5) is provided with an inwardly extending protrusion (8*c*), and the recess (5*b*) of the plug (2) is provided with a first groove (8*c*1) and a second groove (8*c*2), where the first groove (8*c*1) is adapted for receiving the protrusion (8*c*), when the locking ring is in the second position, the locked position, and where the second groove (8*c*2) is adapted for receiving the protrusion (8*c*), when the locking ring is in the first position, the unlocked position.

7. The user control unit (1) and electrical cord (3) according to claim 5 wherein the plug (2) comprises an electrical connector (18), a circular sealing ring recess (7) and a sealing ring (20), where the circular sealing ring recess (7) is placed between the recess (5*b*) and the electrical connector (18).

8. The user control unit (1) and electrical cord (3) actuator system according to claim 7, wherein the sealing ring (20) comprises two spaced apart outer lips.

9. The user control unit (1) and electrical cord (3) according to claim 7 wherein an inner side of the sealing ring (20) is provided with at least two spaced apart protrusions (22) having a half circular cross section protruding from its inner periphery.

* * * * *